United States Patent
Cahill et al.

(10) Patent No.: US 12,393,772 B2
(45) Date of Patent: *Aug. 19, 2025

(54) TRACKING APPROVALS FOR AN ELECTRONIC DOCUMENT MANAGED BY AN ELECTRONIC DOCUMENT PLATFORM

(71) Applicant: Google LLC, Mountain View, CA (US)

(72) Inventors: Emily Cahill, Brooklyn, NY (US); Shamil Parbhoo, Brooklyn, NY (US); Lloyd Mckenzie, Denver, CO (US); John Gabriel D'Angelo, New York, NY (US); Jeffery Hoehl, New York, NY (US); Gregory George Galante, Little Silver, NJ (US); Behnoosh Hariri, New York, NY (US); Joy Xi, Lakewood, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,894

(22) Filed: Mar. 19, 2024

(65) Prior Publication Data
US 2024/0220713 A1     Jul. 4, 2024

Related U.S. Application Data

(63) Continuation of application No. 18/061,403, filed on Dec. 2, 2022, now Pat. No. 11,972,200.

(51) Int. Cl.
*G06F 40/166* (2020.01)
*G06F 16/176* (2019.01)
(Continued)

(52) U.S. Cl.
CPC .......... *G06F 40/166* (2020.01); *G06F 16/176* (2019.01); *G06F 40/194* (2020.01); *G06Q 10/101* (2013.01)

(58) Field of Classification Search
None
See application file for complete search history.

(56) References Cited

U.S. PATENT DOCUMENTS 6,704,906 B1      3/2004   Yankovich et al.
6,832,202 B1 *  12/2004   Schuyler ............... G06Q 10/10
                                                                 705/7.26

(Continued)

OTHER PUBLICATIONS

"Setting up approvals on the Huddle web app," https://huddle.zendesk.com/hc/en-us/articles/200124953-Setting-up-approvals-on-the-Huddle-web-app#top, Aug. 21, 2022, pp. 1-9.

(Continued)

*Primary Examiner* — Maikhanh Nguyen
(74) *Attorney, Agent, or Firm* — Lowenstein Sandler LLP

(57) ABSTRACT

An electronic document associated with users of a collaborative document platform is identified. The electronic document is associated with a data structure including entries that each correspond to an approval request for a respective user to approve at least a portion of content of the electronic document. At least a portion of the data structure is embedded within the content of the electronic document for presentation to a first user. A first user updating a first entry of at least a portion of the data structure is detected. The update to the first entry corresponds to a first approval request for a second user to approve one or more portions of the content of the electronic document. The data structure is updated to include data of the first entry in accordance with the update to the first entry by the first user.

20 Claims, 10 Drawing Sheets

(51) Int. Cl.
*G06F 40/194* (2020.01)
*G06Q 10/101* (2023.01)

(56) References Cited

U.S. PATENT DOCUMENTS

| | | | |
|---|---|---|---|
| 6,918,082 B1 | 7/2005 | Gross et al. | |
| 7,890,872 B2 | 2/2011 | Champlain et al. | |
| 8,725,549 B2 | 5/2014 | Arroyo et al. | |
| 9,135,312 B2 | 9/2015 | Greenspan et al. | |
| 9,965,685 B2 | 5/2018 | Matsuoka et al. | |
| 10,101,893 B1 | 10/2018 | Van Doorn et al. | |
| 10,346,532 B2 | 7/2019 | Codrington et al. | |
| 10,769,365 B2 | 9/2020 | Fern et al. | |
| 10,810,361 B1 | 10/2020 | Venkatraman et al. | |
| 11,334,375 B2 | 5/2022 | Smith et al. | |
| 11,972,200 B1 * | 4/2024 | Cahill | G06Q 10/103 |
| 2002/0091725 A1 | 7/2002 | Skok | |
| 2002/0143691 A1 | 10/2002 | Ramaley et al. | |
| 2006/0047555 A1 * | 3/2006 | Kang | G06Q 10/06316 |
| | | | 705/7.26 |
| 2012/0317239 A1 | 12/2012 | Mulder et al. | |
| 2013/0326330 A1 | 12/2013 | Harris et al. | |
| 2015/0339282 A1 | 11/2015 | Goyal | |
| 2017/0200123 A1 | 7/2017 | Safa | |
| 2021/0248556 A1 | 8/2021 | Venkatraman et al. | |

OTHER PUBLICATIONS

"Get approvals on files in Google Drive," https://support.google.com/drive/answer/9387535?hl=en#zi, Jul. 22, 2022, pp. 1-3.

International Search Report and Written Opinion for International Application No. PCT/US2023/078241 mailed Feb. 16, 2024, 18 Pages.

Skees T., "How to request approvals in Google docs, sheets, and slides," https://copyprogramming.com/howto/how-to-request-approvals-in-google-docs-sheets-and-slides, Aug. 3, 2022, pp. 1-32.

"Step 10: Approving work in Huddle," https://huddle.zendesk.com/hc/en-us/articles/220740188-Step-10-Approving-.work-in-Huddle, Aug. 21, 2022, pp. 1-10.

* cited by examiner

| REVIEWER 312 | STATUS 314 | DUE DATE 316 | NOTES 318 |
|---|---|---|---|
| Mr. Brown | Approved.<br>Decision Date: July 18, 2022 | July 19, 2022 | Please look at the budget for this project. |
| John Doe | Rejected.<br>Decision Date: Aug 1, 2022<br>Notes: Add more details to the timeline | Aug 1, 2022 | Please approve the project timeline. |
| Jane Doe | Approved.<br>Decision Date: Aug 6, 2022 | Aug 9, 2022 | Please approve the changes to the document. |
| John Doe | Requested. | Aug 25, 2022 | Please approve the updated project timeline. |

FIG. 3

GUI 410 — 412

2. TERM: The premises are leased on the following lease term: from January 1, 2022 until January 1, 2023.

3. SECURITY DEPOSITS: TENANT shall deposit with landlord the sum of $1,000 as a security deposit to secure tenant's faithful performance of the terms of this lease. The security deposit shall not exceed two times the monthly rent. At the end of the lease term, landlord may use the security deposit for cleaning of the premises, any unusual wear and tear to the premises or common areas, and any rent or other amounts owed pursuant to the lease agreement or pursuant to Civil Code Section 1950.5. Tenant may not use said deposit for rent owed during the term of the lease. Within 21 days of the tenant vacating the premises, landlord shall furnish tenant a written statement indicating any amounts deducted from the security deposit and returning the balance to the tenant.

414 ← 416

420

| REVIEWER 422 | STATUS 424 | DUE DATE 426 | NOTES 428 |
|---|---|---|---|
| 330A — John Doe | Approved. Decision Date: Aug 6, 2022 | Aug 9, 2022 | Please approve the changes to the document. |
| 330B — Jane Doe | Requested. | Aug 25, 2022 | Please approve the updated project timeline. |

ADD ENTRY 440

FIG. 4A

GUI 410

ADD ENTRY 440

412

2. TERM: The premises are leased on the following lease term: from January 1, 2022 until January 1, 2023.

3. SECURITY DEPOSITS: TENANT shall deposit with landlord the sum of $1,000 as a security deposit to secure tenant's faithful performance of the terms of this lease. The security deposit shall not exceed two times the monthly rent. At the end of the lease term, landlord may use the security deposit for cleaning of the premises, any unusual wear and tear to the premises or common areas, and any rent or other amounts owed pursuant to the lease agreement or pursuant to Civil Code Section 1950.5. Tenant may not use said deposit for rent owed during the term of the lease. Within 21 days of the tenant vacating the premises, landlord shall furnish tenant a written statement indicating any amounts deducted from the security deposit and returning the balance to the tenant.

4. OCCUPANTS: The premises shall not be occupied by any person other than those designated above as tenant with exception of the following named persons:

416

420

| REVIEWER 422 | STATUS 424 | DUE DATE 426 | NOTES 428 |
|---|---|---|---|
| John Doe | Approved. Decision Date: Aug 6, 2022 | Aug 9, 2022 | Please approve the changes to the document. |
| Jane Doe | Requested. | Aug 25, 2022 | Please approve the updated project timeline. |
| John Doe | Requested. | Aug 27, 2022 | Please approve the changes to the document. |

GUI 410

ADD ENTRY 440

412

2. TERM: The premises are leased on the following lease term: from January 1, 2022 until January 1, 2023.

3. SECURITY DEPOSITS: TENANT shall deposit with landlord the sum of $1,000 as a security deposit to secure tenant's faithful performance of the terms of this lease. The security deposit shall not exceed two times the monthly rent. At the end of the lease term, landlord may use the security deposit for cleaning of the premises, any unusual wear and tear to the premises or common areas, and any rent or other amounts owed pursuant to the lease agreement or pursuant to Civil Code Section 1950.5. Tenant may not use said deposit for rent owed during the term of the lease. Within 21 days of the tenant vacating the premises, landlord shall furnish tenant a written statement indicating any amounts deducted from the security deposit and returning the balance to the tenant.

4. OCCUPANTS: The premises shall not be occupied by any person other than those designated above as tenant with exception of the following named persons:

414

416

420

| REVIEWER 422 | STATUS 424 | DUE DATE 426 | NOTES 428 |
|---|---|---|---|
| John Doe (330A) | Approved. Decision Date: Aug 6, 2022 | Aug 9, 2022 | Please approve the changes to the document. |
| Jane Doe (330B) | Requested. | Aug 25, 2022 | Please approve the updated project timeline. |
| John Doe (430) | Approved. Decision Date: Aug 25, 2022 | Aug 27, 2022 | Please approve the changes to the document. |

FIG. 4C

| REVIEWER 512 | STATUS 514 | DUE DATE 516 | NOTES 518 |
|---|---|---|---|
| Mr. Brown | Approved. Decision Date: July 18, 2022 | July 19, 2022 | Please look at the budget for this project. |
| John Doe | Rejected. Decision Date: Aug 1, 2022 Notes: Add more details to the timeline | Aug 1, 2022 | Please approve the project timeline. |
| Jane Doe | Approved. Decision Date: Aug 6, 2022 | Aug 9, 2022 | Please approve the changes to the document. |
| John Doe | Requested. | Aug 25, 2022 | Please approve the updated project timeline. |
| Jane Doe | Requested. | Aug 27, 2022 | Please approve the changes to the document. |

FIG. 5

TRACKING APPROVALS FOR AN ELECTRONIC DOCUMENT MANAGED BY AN ELECTRONIC DOCUMENT PLATFORM

CROSS-REFERENCE TO RELATED APPLICATIONS

This application is a continuation of U.S. patent application Ser. No. 18/061,403, filed Dec. 2, 2022, which is hereby incorporated in its entirety herein by reference.

TECHNICAL FIELD

Aspects and implementations of the present disclosure relate to tracking approvals for an electronic document managed by an electronic document platform.

BACKGROUND

A platform (e.g., an electronic document platform, etc.) can enable users to access electronic documents via a graphical user interface (GUI) associated with the platform. In some instances, users can add, modify, and/or remove content of an electronic document (e.g., via a platform GUI provided to a client device associated with a user by the platform). In some instances, an electronic document platform can be a collaborative document platform. Users of a collaborative document platform can collaborate on an electronic document across one or more client devices. For example, a first user can update the electronic document by providing one or more edits and a second user can access the updated electronic document to see the edits provided by the first user. In some instances, a user of the collaborative document platform can request approval of another user for edits made to an electronic document.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for providing approval requests of electronic documents at a platform. In an implementation, a method includes identifying an electronic document associated with users of a collaborative document platform. The electronic document is associated with an approval data structure. The approval data structure includes entries that each correspond to an approval request for a user to approve at least a portion of content of the electronic document. The method further includes providing a first client device associated with a first user with access to the electronic document. A portion of the approval data structure is included within the content of the electronic document for presentation to the first user. The method further includes detecting that the first user has updated a first entry of the portion of the approval data structure included within the contents of the electronic document via the first client device. The update to the first entry corresponds to a first approval request for a second user to approve one or more portions of the content of the electronic document. The method further includes transmitting a first notification to a second client device associated with the second user. The first notification indicates the first approval request. The method further includes updating the approval data structure to include data of the first entry in accordance with the update to the first entry by the first user of the first client device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 illustrates an example of an approval data structure associated with an electronic document, in accordance with implementations of the present disclosure.

FIG. 4A-4C illustrates an example of updating a portion of an approval data structure included within content of an electronic document, in accordance with embodiments of the present disclosure.

FIG. 5. illustrates an example of updating an approval data structure associated with an electronic document, in accordance with implementations of the present disclosure.

DETAILED DESCRIPTION OF THE DRAWINGS

Figure 1:
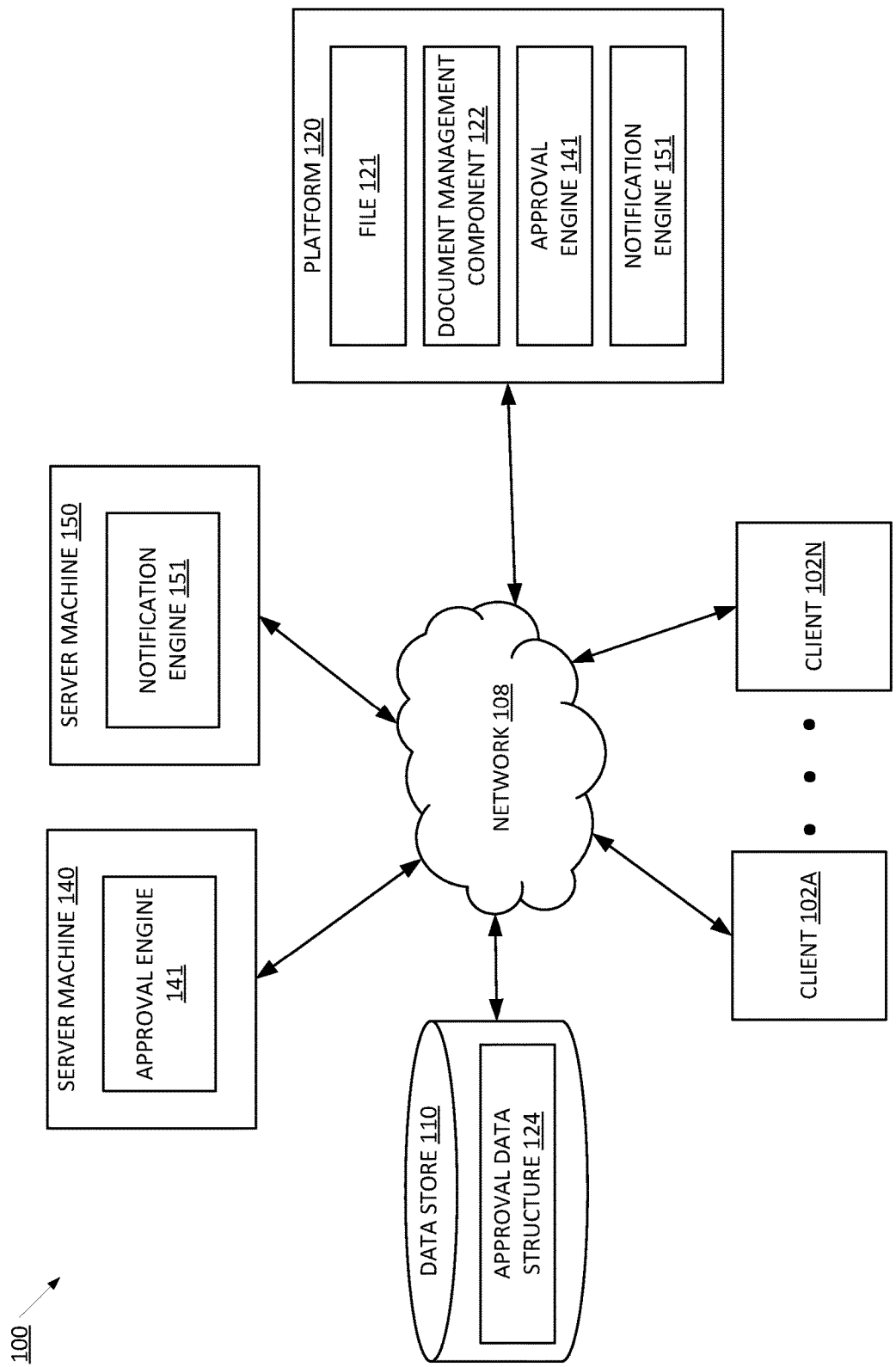
FIG. 1 illustrates an example system architecture, in accordance with implementations of the present disclosure.

Aspects of the present disclosure generally relate to tracking approvals for a collaborative electronic document managed by an electronic document platform. An electronic document platform, such as a collaborative document platform, can provide a user with access to an electronic document via a graphical user interface (GUI). The platform GUI can enable the user to consume the document, edit the document, annotate the document, and so forth. In some instances, multiple users may access and/or edit an electronic document via the collaborative document platform. For example, a first user can access and edit the document using a first client device and a second user can access edits made by the first user to the document using a second client device.

In some instances, a platform can enable users to solicit approval of edits made to the document by other users. For example, a user of the platform can edit content of an electronic document, as described above. In some instances, the user can request approval of the edits from one or more other users of the platform. For example, one or more employees can work on a report with a manager. The employees can edit content of the report document while working on preparing the report. The employee can then send the edited report document to their manager for approval (e.g., before the report is sent out to a customer, another manager, etc.). A user of the platform can request approval of the document by engaging with one or more elements of the platform GUI designated for requesting approval by another user of the platform. When the other user (referred to herein as an approver) accesses the document (e.g., via the platform GUI), the platform can provide a notification to the approver indicating the request for approval by the requesting user (referred to herein as the requestor). The approver can review the edits made by the document by the requestor and can provide an approval decision (e.g., approve or reject) the edits using the tool. The requestor may receive a notification (e.g., via electronic mail (e-mail), etc.) of the approval decision provided by the approver.

Conventional platforms do not enable users to easily track approvals provided by users associated with an electronic document. In some instances, multiple users may be responsible for approving one or more sections of an electronic document before a finalized version can be created. In order to determine whether a finalized version of the electronic document can be created, a user (e.g., a requestor) may search through an e-mail inbox to identify notifications (e.g., e-mails) received in response to approval decisions from approvers and determine whether each approver has provided their approval for their respective section. It can take a significant amount of time for the requestor to identify such notifications, which can consume a large amount of computing resources (e.g., processing cycles, memory resources, etc.). If the requestor is not able to identify a notification for an approval decision provided by one or more approvers, the requestor may need to provide another approval request to such approvers (e.g., to ensure that the required approval is received from all responsible users). Such approvers may provide another approval decision (e.g., by accessing the electronic document via the platform GUI) for their respective sections of the electronic document and another notification indicating the approval decision is transmitted to the requesting user. Accordingly, a requestor may solicit approval of provided edits to the content of the electronic document that have already been approved by reviewers, which creates redundancy by causing users to access the document for longer time periods. Soliciting additional approvals from users can consume additional computing resources, causing such resources to be unavailable for other processes. Accordingly, an overall efficiency is decreased and an overall latency for the platform is increased.

In addition, conventional platforms enable a requestor to request approval for all content of an electronic document rather than a particular portion of content of the electronic document. In some instances, an electronic document can be significantly large (e.g., hundreds or thousands of pages). A user may provide updates to one or more sections of content of the electronic document. Conventional platforms do not enable the user to request approval from approvers for the particular sections that include the edits, and instead the user needs to request approval for the entire electronic document. An approver may agree with the edits made to the content of a first section of the electronic document but not a second section of the electronic document. However, as the approval request is made for the entire electronic document rather than particular sections of the document, the approver is not able to provide a first approval decision (e.g., an approval) to the first section and a second approval decision (e.g., a rejection) to the second section. If the approver approves the document, the requestor may not be notified that the approver disagrees with the second section of the document, and therefore may not make appropriate changes to the second section that the approver desires. If the approver rejects the document, the approver may spend additional time and computing resources to provide unnecessary edits to the content of the first a section of the document, which can increase an overall latency of the platform and decrease an overall efficiency of the platform, as indicated above.

Finally, conventional platforms present the status (e.g., pending, approved, rejected, etc.) of an approval request via a portion of the platform GUI that is separate from the content of the electronic document. Because such information is not included in the content of the document, a user that generates and/or accesses a physical copy (e.g., a hardcopy or a printed copy) of the electronic document is unable to determine whether the document is approved by respective approvers without also accessing the electronic document via the platform GUI of a client device. Obtaining a physical copy of an electronic document and then accessing the electronic document via the platform GUI to determine the approval status for the document can take a significant amount of time and therefore consume a significant amount of computing resources, which can increase an overall system latency and decrease an overall system efficiency, as indicated above.

Aspects of the present disclosure address the above deficiencies by enabling a collaborative document platform to facilitate and track approval requests and responses via an approval data structure included (e.g., embedded) within content of an electronic document. An electronic document platform (e.g., a collaborative document platform) can manage or host electronic documents that are accessible to multiple users of the platform. Electronic documents can be or correspond to a word document, slide presentation document, a spreadsheet document, etc. Each electronic document can be associated with an approval data structure. The platform can use the approval data structure to track approvals requested from and provided by users of the platform, in accordance with embodiments described herein. In some embodiments, the approval data structure can be stored at a data store that is accessible by the collaborative document platform (e.g., via a network). An approval data structure can include one or more entries that correspond to approval requests for an approver to approve at least a portion of content of the electronic document. For example, the platform can update an entry of the approval data structure to include data associated with an approval request by a requestor (e.g., in response to detecting the approval request). The platform can update the entry to include data associated with an approval or a rejection by the approver in response to the approval request. Further details regarding the approval data structure are provided herein. As used herein, an approver can represent a user of the collaborative document platform who has privileges to edit a document (e.g., add content to the document, modify existing content of the document, removing existing content from the electronic, etc.), request approval of document content, and update approval data structure entries (e.g., add an approval data structure entry, remove an existing approval data structure entry, modify an existing approval data structure entry, etc.). A requester can represent a user of the collaborative document platform who has privileges to edit a document (e.g., add content to the document, modify existing content of the document, removing existing content from the electronic, etc.), respond to approval requests (e.g., accept edits made to document content, deny edits made to document content, etc.), and update approval data structure entries (e.g., add an approval data structure entry, remove an existing approval data structure entry, modify an existing approval data structure entry, etc.).

Embodiments of the present disclosure provide that at least a portion of the approval data structure can be included within the content of an electronic document. Users accessing the electronic document can interact with entries of the included portion of the approval data structure to provide requests for approval to edits to the content made by the users and/or respond to requests to approval from other users of the platform. For example, a first user of the platform (e.g., a requestor) can provide one or more edits to one or more portions of content of the electronic document via the platform GUI. An edit can include adding content to an electronic document, modifying existing content of an electronic document, removing existing content from the electronic document, etc. The requestor can update an entry of the portion of the approval data structure that is included within the content of the electronic document via the platform GUI to include an indication of a second user that is to provide approval of the edits made to the document (e.g., an approver or a reviewer). The collaborative document platform may detect that the requestor has updated an entry of the portion of the approval data structure included within the content of the electronic document. As indicated above, the updated entry may correspond to a first approval request for the second user to approve edits made by the first user. Upon detecting the update to the entry of the included portion of the data structure, the platform can update the approval data structure (e.g., at the data store) to include data of the updated entry. In addition to or in response to updating the approval data structure, the collaborative document platform may transmit a notification (e.g., an electronic mail notification, a push notification, etc.) to a second client device associated with the second user. In some embodiments, the second user can access the electronic document via the platform GUI at the second client device (or another client device) and can update the entry of the included portion of the approval data structure to indicate an approval or rejection to the edits made to the one or more portions of the content by the first user. In such embodiments, the second user accesses the electronic document using the same application (e.g., a document editing application) that the first user accessed to provide the approval request. Further details regarding such examples are provided with respect to FIGS. 4A-4C.

In other or similar embodiments, the notification transmitted to the second client device alerting the second user to the first approval request can be provided to the second user via a different application than the application that the first user accessed to provide the approval request. For example, the notification can be provided to the second user via an electronic mail application. The second user can provide a response to the approval request by engaging with an approval GUI element or a rejection GUI element provided via a GUI of the second client device by the electronic mail application. After the second user provides a response to the approval request, the platform can update the approval data structure to include additional data corresponding to the response. The portion of the approval data structure embedded within the content of the electronic document can also be updated to include the additional data corresponding to the response. Users of the platform that access the electronic document (e.g., the first user, the second user, etc.) can accordingly view the approval request and response history based on the updates to the embedded portion of the approval data structure. Further details regarding such an example are provided with respect to FIG. 6.

In some embodiments, one or more first portions of the approval data structure can be associated with first content of the electronic document and one or more second portions of the approval data structure can be associated with second content of the electronic document. A user can cause (e.g., by interacting with one or more GUI elements) the first portions of the data structure to be embedded in a region of the electronic document that is near or adjacent to the first content of the electronic document and the second portions of the data structure to be embedded in a region of the document that is near or adjacent to the second content of the electronic document. Accordingly, users can solicit and provide approval decisions for the first content and/or the second content via the respective first portions and second portions of the data structure.

Aspects of the present disclosure address the above and other deficiencies by providing techniques for tracking approval requests and responses via a portion of an approval data structure embedded within content of an electronic document. By facilitating and tracking approval requests and responses within the electronic document, users can easily access the approval request and response history when accessing the electronic document to determine a status of the electronic document, which can improve overall system workflow and reduce the amount of time that users are editing an electronic document and/or the amount of time users spend interacting with the associated electronic document platform. Accordingly, fewer computing resources are consumed by the collaborative document platform, which improves an overall efficiency of a system including the collaborative document platform and decreases overall latency of the system. Further, embodiments of the present disclosure enable users to provide approval decisions for respective sections of an electronic document, rather than an entire electronic document (e.g., which may be hundreds or thousands of pages long). Users are therefore able to identify rejected sections and make appropriate corrections more quickly, which can reduce the amount of time such users spend accessing and editing the electronic document. Accordingly, more computing resources are made available to other processes of the computing system, which can increase an overall efficiency and decrease an overall latency of the computing system.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document displayed via a graphical user interface (GUI) on a client device 102, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Each client device can include a content viewer. In some embodiments, a content viewer can be an application that provides a graphical user interface (GUI) for users to view, create, or edit content of a file 121, such as an electronic document file, an electronic message file (e.g., an email file), an image file, a video file, etc. For example, the content viewer can be a web browser that can access, retrieve, present, and/or navigate files 121 served by a web server. The content viewer can render, display, and/or present the content of a file 121 to a user. In one example, the content viewer can be a standalone application (e.g., a mobile application or app) that allows users to view, edit, and/or create digital content items (e.g., electronic documents, electronic messages, digital video items, digital images, electronic books, etc.). In some implementations, the content viewer can be an electronic document platform application for users to generate, edit, and/or upload content for electronic documents on the platform 120. In other or similar implementations, the content viewer can be an electronic messaging platform application (e.g., an electronic mail (e-mail) application) for users to generate and send messages via platform 120. As such, the content viewers can be provided to the client devices 102A-102N by platform 120.

In some implementations, platform 120 and/or server machine 150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to a file 121 (e.g., an electronic document, an e-mail message, etc.) and/or provide the file 121 to the user. For example, platform 120 can be an electronic document platform, such as a collaborative document platform. The electronic document platform may allow a user to create, edit (e.g., collaboratively with other users), access or share with other users an electronic document stored at data store 110. In another example, platform 120 can be an electronic messaging platform (e.g., e-mail platform). The electronic messaging platform can allow a user to create, edit, or access electronic messages (e.g., e-mails) addressed to other users of the electronic messaging platform or users of client devices outside of the electronic messaging platform. Platform 120 can also include a website (e.g., a webpage) or application back-end software that can be used to provide a user with access to files 121.

As illustrated in FIG. 1, platform 120 can include a document management component 122, in some embodiments. Document management component 122 can be configured to manage access to a particular document by a user of platform 120. For example, a client device 102 can provide a request to platform 120 for a particular file 121 corresponding to an electronic document. Document management component 122 can identify the file 121 (e.g., stored in data store 110) and can determine whether a user associated with the client device 102 is authorized to access the requested file 121. Responsive to determining that the user is authorized to access the requested file 121, document management component 122 can provide access to the file 121 to the client device 102. The client device 102 can provide the user with access to the file via the GUI of the content viewer, as described above.

As indicated above, a user can create and/or edit an electronic document (e.g., of file 121) via a GUI of a content viewer of a client device associated with the user (also referred to herein as a platform GUI). The electronic document can include content, in some embodiments, Content can include one or more text strings, images, videos, graphics, etc. In some embodiments, the electronic document can be or can correspond to a word document, slide presentation document, a spreadsheet document, and so forth. Platform 120 is configured to enable a user to create and/or edit an electronic document. For example, a client device 102A associated with a user of platform 120 can transmit a request to platform 120 to create a word document based on a word document template associated with platform 120. Platform 120 can generate a file 121 associated with the word document based on the word document template and can provide the user with access to the word document via the platform GUI. In another example, a client device 102 associated with a user of platform 120 can transmit a request to access an electronic document (e.g., a word document) via the platform GUI. Document management component 122 can obtain the file 121 associated with the requested electronic document, as described above, and platform 120 can provide the user with access to the electronic document via the platform GUI. The user can edit one or more portions of the electronic document via the platform GUI and the platform 120 can update the file 121 associated with the electronic document to include the edits to the one or more portions. The electronic document can be a collaborative document that, in some embodiments, can be edited (e.g., concurrently) by one or more users of platform 120.

An approval data structure 124 can be stored at data store 110. The approval data structure can be maintained and/or otherwise accessible to platform 120 (e.g., via network 108, via a bus, etc.). The approval data structure 124 can include entries corresponding to approval requests. An approval request can include, for example, a request by one or more users (e.g., a requester) of platform 120 for another user of platform 120 (e.g., a reviewer) to provide an approval decision (e.g., accept, reject, etc.) with respect to edits made to an electronic document. As indicated above, an electronic document can include content. In some embodiments, a portion of an approval data structure can be embedded within the content of the electronic document. For example, a portion (e.g., one or more entries) of the approval data structure can be embedded above, below, or within the one or more portions of content such that the embedded portion of the data structure is presented as a respective content object of the electronic document (e.g., via the platform GUI), in accordance with embodiments, of FIGS. 4A-4C. Platform 120 can enable the user to provide and/or modify the portion of the approval data structure embedded within the content of the electronic document, in accordance with embodiments described below. For example, the user can update an entry of the embedded portion of the approval data structure by interacting with one or more GUI elements associated with one or more fields of an entry. Updating the embedded portion of the approval data structure can additionally or alternatively include a user adding an additional entry to the embedded portion of the approval data structure via the one or more GUI elements of the platform GUI. For example, the user can edit the embedded portion of the approval data structure to add an entry (e.g., an approval entry, as described with respect to FIG. 4B). The approval entry that is added or updated by a user can correspond to an approval request.

As illustrated in FIG. 1, platform 120 can include an approval engine 141. Approval engine 141 can manage and track approval requests by users of platform 120. Approval engine 141 can update approval data structure 124, and the portion of approval data structure embedded within the content of the document, based on approval requests and corresponding approval decisions (e.g., approvals, rejections, etc.) provided by users of platform 120, as described herein. In some embodiments, approval engine 141, can detect updates made to the approval data structure embedded within the contents of the electronic document. In an illustrative example, approval engine 141 can detect that a user (e.g., a requester) has added one or more entries to a portion of an approval data structure embedded within an electronic document (e.g., via the platform GUI). Responsive to detecting that the requester has added one or more entries to the embedded portion of the approval data structure, approval engine 141 can update approval data structure 124 associated with the electronic document based on the entry the requester has added to the portion of the approval data structure embedded within the contents of the electronic document. Further details regarding approval data structure 124 and approval engine 141 are provided herein.

A notification engine 151 can transmit a notification to a user (e.g., a reviewer) of platform 120 indicating an approval request provided by another user. For example, in response to approval engine 141 updating approval data structure 124, notification engine 151 can transmit a notification to a client device 102 associated with the reviewer indicating that another user (e.g., the requestor) has requested approval of edits made to an electronic document. As described above, the requestor can provide the request by updating one or more entries of the portion of the approval data structure embedded within the content of the electronic document, as described herein. In some embodiments, notification engine 151 can transmit the notification via an electronic mail (e-mail) application and/or via a push notification application.

It should be noted that although FIG. 1 illustrates approval engine 141 and notification engine 151 as part of platform 120, in additional or alternative embodiments, approval engine 141 and/or notification engine 151 can reside on one or more server machines that are remote from platform 120 (e.g., server machine 150).

It should be noted that in some other implementations, the functions of server machines 140 and 150 and/or platform 120 can be provided by a fewer number of machines. For example, in some implementations server machines 140 and 150 may be integrated into a single machine, while in other implementations server machines 140 and 150 may be integrated into multiple machines. In addition, in some implementations one or more of server machines 140 and 150 may be integrated into platform 120.

In general, functions described in implementations as being performed by platform 120 and/or server machines 140 and 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that track approvals for an electronic document.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
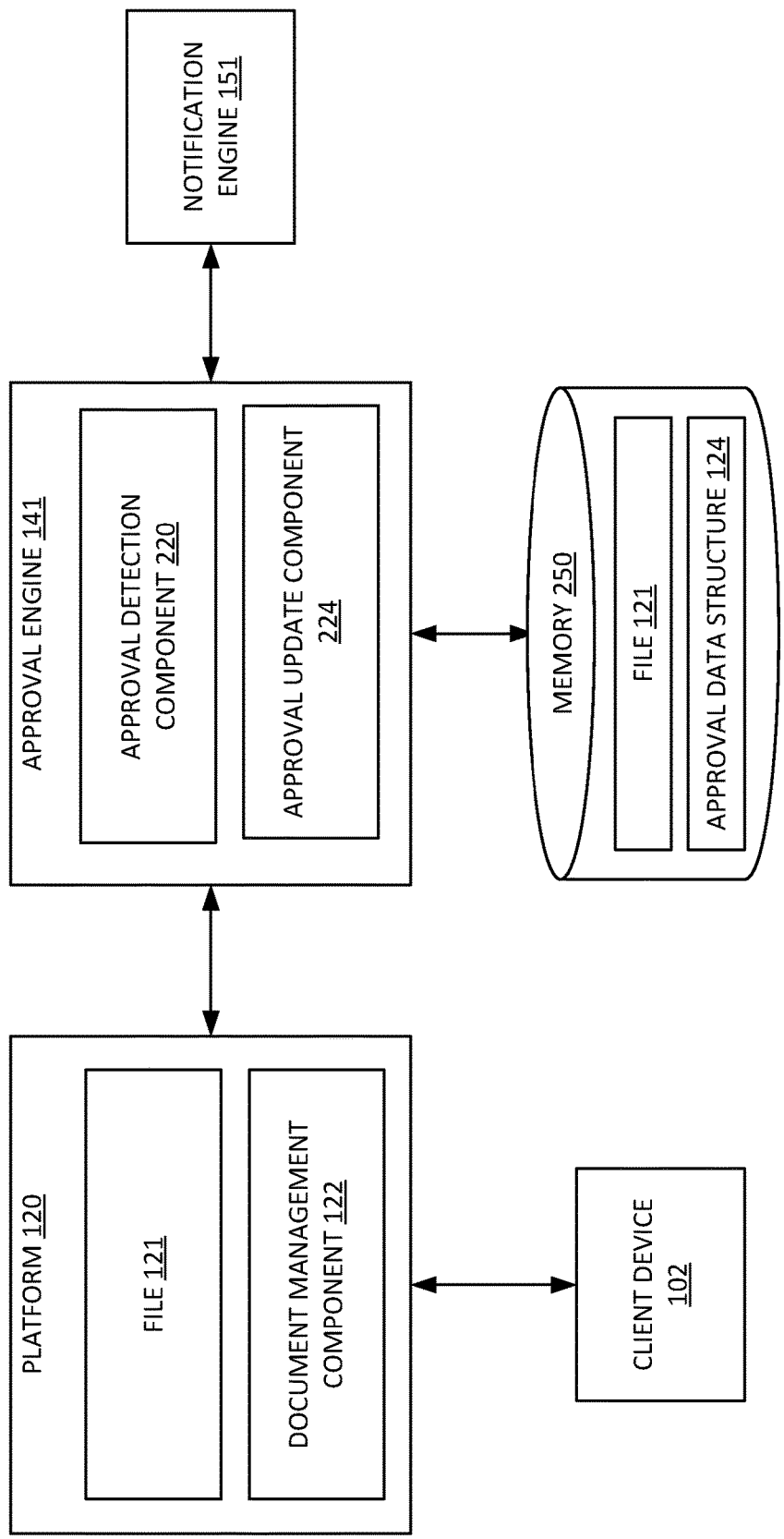
FIG. 2. is a block diagram illustrating an example platform and an approval engine, in accordance with implementations of the present disclosure.

FIG. 2 is a block diagram illustrating an example platform 120 and an approval engine 141, in accordance with implementations of the present disclosure. In some embodiments, platform 120 can include a file 121, and/or a document management component 122, as described with respect to FIG. 1. Platform 120 can be connected (e.g., via network 108) to one or more client device 102 (e.g., client devices 102A-102N, etc.). File 121 can be a file for an electronic document, such as a word document, a slide presentation document, a spreadsheet document, etc. As described with respect to FIG. 1, the electronic document of file 121 can include content that is accessible by users of platform 120 via a platform GUI provided via one or more client devices 102. Content can include text, drawings, images, and/or the portion of the approval data structure embedded within the content of the electronic document.

In some embodiments, platform 120, approval engine 141 and/or notification engine 151 can be connected to memory 250 (e.g., via a network such as network 108, via a bus, etc.). In some embodiments, one or more portions of memory 250 can correspond to data store 110. In some embodiments, one or more portions of memory 250 can additionally or alternatively correspond to a memory of client device 102 and/or another memory associated with system 100.

As described above, document management component 122 can provide a user with access to an electronic document via a content viewer GUI provided by platform 120 (referred to as platform GUI herein). In some embodiments, the user can interact with the electronic document via one or more peripheral devices (e.g., a keyboard, a touch screen, a mouse, etc.) that is included with or otherwise connected to client device 102. For example, the user can edit text by engaging with keys of a keyboard and/or buttons of a touch screen of client device 102. In response to detecting that the user has engaged with one or more keys of the keyboard and/or buttons of the touch screen, platform 120 can update one or more sections of the electronic document to correspond with the user-provided edit.

As indicated above, approval engine 141 can be configured to manage and track approval requests and/or approval decisions provided by users of platform 120 An approval request refers to a request by a first (e.g., the requestor) for a second user (e.g., an approver) to provide an approval decision (e.g., an approval, a rejection, etc.) for content of an electronic document. Approval engine 141 can include an approval detection component 220, and/or an approval update component 224, as illustrated in FIG. 2. In some embodiments, the electronic document can be associated with one or more approval data structures (e.g., approval data structure 124), as described above. Platform 120 can use approval data structure 124 to maintain and/or track approval requests. Approval data structure 124 can include one or more entries that are each associated with approval requests and corresponding approval decisions, as described below with respect to FIG. 3. FIG. 3 illustrates an example approval data structure 124 associated with an electronic document, in accordance with implementations of the present disclosure. As illustrated by FIG. 3, approval data structure 124 can include one or more entries 330 that each correspond to a respective approval request (e.g., the first approval request, the second approval request, the third approval request, etc.) made for the electronic document. Each entry 330 can include a reviewer field 312, a status field 314, a due date field 316, and a notes field 318. Reviewer field 312 of a respective entry 330 can include an identifier associated with a user of platform 120 associated with reviewing the corresponding approval request. Status field 314 of the respective entry 330 can include indication of a status of the approval request. Due date field 316 can include a due date associated with the approval request. Notes field 318 can include additional details (e.g., edits made to the electronic document) associated with the approval request. In some embodiments, each entry 330 can include additional fields (e.g., name of a requester, request date, reviewer comments, etc. (not shown)) associated with the approval request.

In some embodiments, approval engine 141 can use approval data structure 124 to track a status of approval requests and/or approval decisions provided by users of platform 120. A user of platform 120 can request approval of edits made to content of the electronic document according to one or more techniques, as described herein. In some embodiments, a platform GUI can provide one or more GUI elements that enable a user (e.g., a requestor) to request approval of edits made to content of the electronic document. When the user interacts with the one or more GUI elements, a region of the platform GUI (e.g., a sidebar near or adjacent to the content of the electronic document) can be updated to include additional elements that enable the user to provide an indication of another user (e.g., an approver) that is to provide an approval decision in accordance with the approval request. Approval detection component 220 detects that the requestor has provided the approval request via the sidebar and updates data structure 124 to include an entry that corresponds to the approval request. The approver can access the electronic document via the platform GUI at a client device associated with the approver. When the approver accesses the electronic document, a region of the platform GUI (e.g., a side bar near or adjacent to the content of the electronic document) can be updated to include an indication that the requestor has requested approval of the edits made to the electronic document. The side bar can additionally include GUI elements that enable the approver to provide an approval decision (e.g., to approve or reject) with respect to the edits made to the content of the electronic document. The approver can review the edits made to the document by the requestor and can engage with the one or more GUI elements of the sidebar to indicate the approval decision. Approval detection component 220 can detect that the approver has provided the approval decision (e.g., the approval or rejection) and can update the entry of data structure 124 to include an indication of the approval decision.

In an illustrative example, the requestor can provide an approval request and indicate a reviewer (e.g., "John Doe"), a due date (e.g., "Aug. 25, 2022"), and notes (e.g., "please approve the updated project timeline") via the additional elements of a sidebar near or adjacent to the content of the document. Approval detection component 220 can detect that the requestor has provided the approval request via the sidebar and can determine the indicated reviewer, due date, and notes based on the provided approval request. Approval detection component 220 can update data structure 124 to include entry 330B that corresponds to the approval request. Approval detection component 220 can update entry 330B of data structure 124 to include the indicated reviewer, "John Doe," in reviewer field 312; the indicated due date, "Aug. 25, 2022" in due date field 316; the indicated notes, "please approve the update project timeline," in notes field 318; and can automatically populate status field 314 to "requested," as illustrated by FIG. 3. John Doe can review the edits made to the content of the document by the requestor (e.g., via the platform GUI) and can engage with the one or more GUI elements of the sidebar to indicate the approval of the edits. Approval detection component 220 can detect a user interaction at the client device associated with John Doe and can determine, based on the user interaction, that John Doe has provided an approval decision and can update the status field 314 of entry 330B of the approval data structure 124 to indicate the approval decision (not shown).

In additional or alternative embodiments, one or more portions of approval data structure 124 can be embedded within the content of the electronic document. FIGS. 4A-4C illustrate an example of one or more portions of approval data structure 124 embedded within the content of an electronic document. Each of FIGS. 4A-4C include a GUI 410 provided by platform 120 to user devices 102. GUI 410 can display one or more sections 412 of content 414 (e.g., text) included in the electronic document to a user accessing the electronic document via a respective client device 102. As further illustrated in FIGS. 4A-4C, one or more portions of approval data structure 124 can be embedded within content 414 of the electronic document. For example, FIG. 4A illustrates entries 330A and 330B as the portion of approval data structure 124 embedded within content of the electronic document. In some embodiments, portions of approval data structures associated with respective electronic documents of platform 120 can be embedded within the same region of each electronic document. For example, portions of the data structure embedded within the content of a respective electronic document can be automatically (e.g., without user interaction) included above, below, or within the one or more portions of content of the document. As illustrated in FIGS. 4A-C, entries 330A and 330B of data structure 124 can be automatically embedded (e.g., without user interaction) below content 414. In other or similar embodiments, a user can manually insert the portion of the approval data structure to be embedded in the content of the electronic document by interacting with one or more GUI elements of platform GUI associated with embedding portions of the approval data structure 124 into the content of the electronic document. In some embodiments, the user can designate a particular region that is to include the embedded portions of the data structure 124. For example, platform 120 can embed the portion of the approval data structure into the electronic document according to a cursor location of the user.

In some embodiments, a user can request approval of edits made to the electronic document by updating the one or more embedded portions of the approval data structure. In an illustrative example, the platform GUI 410 can include one or more GUI elements (e.g., GUI element 440) that enable the user to add and/or update one or more entries of the portions of approval data structure 124 embedded within the content of the electronic document. The user can engage with (e.g., select, click, etc.) the one or more GUI elements to update an entry of the embedded portion of the approval data structure 124 provided via platform GUI 410. For instance, the user can provide an indication of an identifier associated with one or more users that are subject to the approval request, a due date of the approval request, and/or notes or comments associated with the approval request. As illustrated in FIG. 4A, a requestor can interact with GUI element 440 to add an entry to the portion of the approval data structure embedded within the content of the document. The requestor can update the reviewer field 422 of the added entry to provide an indication of the reviewer to receive the approval request. The requestor can update the due date field 426 of the added to entry to indicate a due date associated with the approval request. The requestor can update the notes field 428 to indicate notes and/or comments associated with the approval request. Responsive to the requestor updating the reviewer field 422, the due date field 426, and the notes filed 428, status field 424 can be automatically populated to be "requested," or "pending."

Referring back to FIG. 2, approval detection component 220 can detect that the requestor has made an update to the portion of the approval data structure 124 embedded within the content of the electronic document. In some embodiments, approval detection component 220 can detect that platform 120 has updated the portion of the approval data structure 124 embedded within the content of the electronic document in response to a user selection or interaction with a peripheral device and/or a GUI element of the platform GUI, as described above. In an illustrative example, one or more portions of approval detection component 220 can be included a web application running on client device 102 to provide the platform GUI to a user associated with the client device 102. In response to the user selection or interacting with the platform GUI, a signal indicating the selection or interaction can be transmitted (e.g., from a controller for a peripheral device of client device 102, etc.) to the web application. The approval detection component 220 can receiving an indication of the selection or interaction from the web application, in some embodiments. In other or similar embodiments, platform 120 can transmit a notification to approval detection component 220 (e.g., via network 108, via a bus, etc.) indicating the update was made to the portion(s) of approval data structure embedded within the content of the electronic document.

As illustrated in FIG. 4B, a user can update content of the electronic document to add text string "4. OCCUPANTS: The premise shall not be occupied by any person other than those designated above as tenant with exception of the following named persons." Such addition can correspond to a respective edit by the user. The user can update the embedded portion of the approval data structure 124 to include an entry associated with an approval request of content within the electronic document. As illustrated in FIG. 4B the user can edit the embedded portion(s) of approval data structure 124 to add approval entry 430. Approval entry 430 can correspond to an approval request from the user to approve one or more portions of the content (e.g., the added portion, other portions, etc.), as described above.

The requester can update one or more fields of entry 430 to include information associated with the approval request. For example, the requester can update the reviewer field 422 to indicate a reviewer or approver that is subject to the approval request (e.g., "John Doe"), the due date field 426 to indicate a due date for the approval request (e.g., "Aug. 27, 2022"), and/or the notes field 428 to include notes or comments associated with the approval request (e.g., "Please approve the changes to the document."). In some embodiments, the requestor can also update the status field 424 of entry 420 to indicate a status (e.g., requested, pending, etc.) of the approval request. In additional or alternative embodiments, platform 120 can populate the status field 424 (e.g., automatically) to indicate that the request is pending. In some embodiments, the user can update a field by selecting an entry from a pre-defined set. For example, the user can select a reviewer 422 from a GUI element (e.g., drop-down menu) indicating a set of pre-defined approvers or reviewers associated with the electronic device via a peripheral device (e.g., a keyboard, a touch screen, a mouse, etc.). The set of pre-defined approvers or reviews can be provided to platform 120 by one or more users of the electronic document, such as one or more owners (e.g., a creator and/or a user that has ownership control) of the electronic document). It is important to note that an entry in the embedded portion(s) of the approval data structure 124 may not always correspond to a request for approval of a user edit to the electronic document. In some embodiments, the entry of embedded portion of the approval data structure can correspond to a review request associated with the electronic document, rather than the content of the electronic document. For example, an entry of the embedded portion of the approval data structure can correspond to an approval request to approve an updated project timeline associated with the electronic document (e.g., approval data structure entry 330B), or a request to approve a budget of a project associated with the electronic document.

Referring back to FIG. 2, in some embodiments, platform 120 can transmit a notification to document management component 122 (e.g., via network 108, via a bus, etc.) indicating the update was made to the embedded portion of the approval data structure 124 by the requester. Responsive to receiving the notification, document management component 122 can prevent certain users (e.g., the requestor) with from editing the electronic by platform 120 until an approval decision has been received from the approver (e.g., in response to the request). For example, a client device 102 can provide a request to platform 120 for a particular file 121 corresponding to the electronic document. Document management component 122 can identify the file 121 (e.g., stored in data store 110) and can determine whether a user associated with the client device 102 is authorized to edit the requested file 121. Responsive to determining that the requester is unauthorized to edit the requested file 121, document management component 122 can provide read-only access to the file 121 to the client device 102. The client device 102 can provide the requester with read-only access to the file via the platform GUI.

Responsive to approval detection component 220 detecting an update to the embedded portion of the approval data structure embedded 124, approval update component 224 can update approval data structure 124 (e.g., at memory 250) to include data associated with the entry added by the requester. In some embodiments, approval update component 224 can receive a notification from approval detection component 220 (e.g., via a bus, etc.) indicating that an update has been made to the embedded portion of the approval data structure 124. Approval update component 224 can identify data associated with the detected updated. The data associated with the detected update can include data added to the fields of the updated entry, as described with respect to FIG. 4A-4C. In some embodiments, the data associated with the detected update can be added to approval data structure 124, described with respect to FIG. 5.

FIG. 5 illustrates updates made to an approval data structure 124 by an approval update component 224 of platform 120, in accordance with embodiments of the present disclosure. As described above with respect to FIG. 3, approval data structure 124 can include one or more entries that each correspond to a respective approval request made for the electronic document. Responsive to obtaining data (e.g., reviewer field 422, status field 424, due date field 426, notes field 428) for a respective update to the embedded portion of the data structure 124 from approval detection component 220, approval update component 224 can add an entry 430 to approval data structure 124 corresponding to the respective update. For example, approval update component 224 can add entry 430 indicating that an approval request has been generated associated with reviewer field 512 ("Jane Doe"), status field 514 ("Requested."), due date field ("Aug. 27, 2022"), and notes field 518 ("Please approve the changes to the document.").

Referring back to FIG. 2, responsive to approval detection component 220 detecting an update to the embedded portion of the approval data structure and/or responsive to approval update component 224 updating the embedded portion of the approval data structure, notification engine 151 can transmit a notification to a second user (e.g., a reviewer) indicating the approval request. For example, notification engine 151 can determine that an entry has been added to approval data structure 124. For example, approval engine 141 can transmit a signal to notification engine 151 (e.g., via a bus, via network 108, etc.) that indicates to notification engine 151 that entry 430 is added to data structure 124. The signal can include data of entry 430, in some embodiments. In another example, approval engine 141 can access data structure 124 and detect that entry 430 is added to data structure 124.

Responsive to determining that entry 430 has been added to approval data structure 124, notification engine 151 can extract, from data of entry 430, an indication of the reviewer associated with the request. Notification engine 151 can transmit a notification to a client device associated with the reviewer indicating the approval request. In some embodiments, notification engine 151 can transmit the notification in a format corresponding to an application associated with the electronic document (e.g., a web application) or in another format (e.g., a push notification format, an email notification format, etc.) associated with another application.

Figure 6:
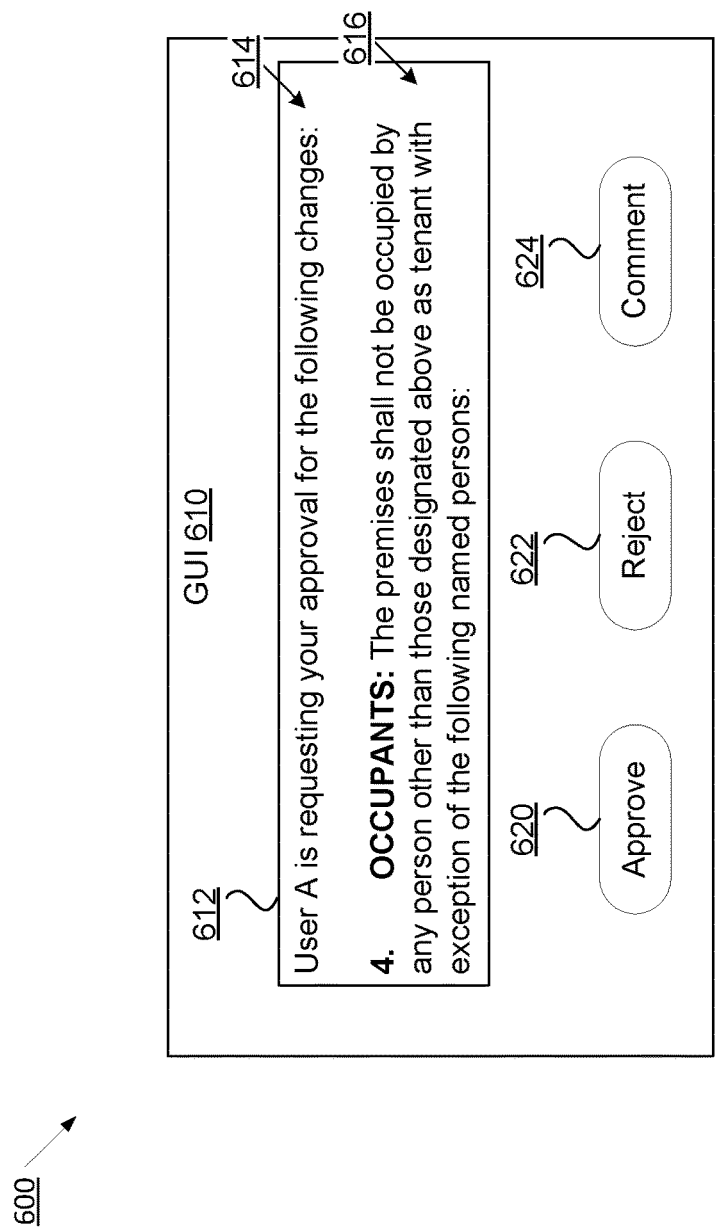
FIG. 6. illustrates presenting an exemplary notification, in accordance with implementations of the present disclosure.

FIG. 6 illustrates an exemplary notification 600 transmitted to a client device 102B by notification engine 151. A client device 102B can provide the reviewer with access to the notification via GUI 610 of notification content viewer 612. In some embodiments, notification content viewer 612 may include a notification associated with the approval request (e.g., notification content 614) and the associated changes made to the electronic document (e.g., notification content 616). In some embodiments, GUI 610 can additionally include GUI elements that enable the reviewer to provide an indication of an approval decision for the edits of the approval request. For example, the additional GUI elements may include an approve button 620, a reject button 622, and/or a comment button 624. Responsive, to detecting a user selection of a particular GUI element, client device 102B may transmit an indication of the response corresponding to the selected GUI element to platform 120. For example, the reviewer can interact with approve button 620. Responsive to detecting the user selection of the approve button 620 (e.g., via GUI 610), client device 102B may transmit a notification indicating the reviewer's approval (e.g., referred to as "approval decision" herein) of the changes made to the electronic document.

In some embodiments, notification engine 151 can receive the notification indicating the reviewer's approval response, described above with respect to FIG. 6, to the approval request of entry 430. Responsive to receiving the notification, notification engine 151 can forward the notification and/or transmit another notification to approval update component 224 indicating the approval decision. Approval update component 224 can subsequently update approval data structure 124 according to the approval decision. For example, notification engine 151 can receive the approval decision from a reviewer (e.g., via an email application of client device 102B) indicating that the reviewer approves the changes made to one or more portions of content of the electronic document. Notification engine 151 can transmit (e.g., via network 108, via a bus, etc.) the approval response to approval update component 224. Referring now to FIG. 5, responsive to receiving the approval response, approval update component 224 can update the status 514 of entry 430 of data structure 124 to indicate that the reviewer has approved the changes made to the electronic document.

In some embodiments, approval update component 224 can also be configured to, responsive to receiving the approval response associated with the approval request, update the embedded portion of the approval data structure 124 to indicate the approval response. For example, as illustrated in FIG. 4C, approval update component 224 can update the status field 424 of entry 430 of the embedded portion of the approval data structure to an "approved." status. In some embodiments, update component 224 can update one or more fields to include additional details associated with the approval response. For example, status field 424 of entry 430 can be updated to additional include a decision data (e.g., "Decision Date: Aug. 25, 2022"). In some embodiments, approval update component 224 can update the embedded portion of the approval data structure in real time (or approximately real time) responsive to receiving an approval decision (e.g., from notification engine 151). While in other embodiments, the embedded portion of the approval data structure can be updated manually responsive to a user interacting with a GUI element of the embedded portion of the approval data structure. For example, a user may interact with a refresh button 416 to transmit a request to update the embedded portion of the approval data structure based on the approval response.

Approval update component 224 can update the embedded portion of approval data structure 124 in response to the request.

In some embodiments, a reviewer can update (e.g., via the platform GUI) one or more existing entries of an approval data structure embedded within the contents of the electronic document to indicate an approval response to approval request. For example, the reviewer can edit status field 424 of entry 430 to approve the changes made to the electronic document. Approval detection component 220 can detect the update and approval update component 224 can update data structure 124 based on the update, as described above.

As indicated above, in some embodiments, portions of approval data structure 124 can be embedded in multiple regions of the content of the electronic document. For example, a user can cause one or more first entries of approval data structure 124 to be embedded within a first region of content and one or more second entries of approval data structure 124 to be embedded with a second region of content. In some embodiments, the user can provide an indication that the first region of content corresponds to the one or more first entries and/or the second region of content corresponds with the one or more second entries by interacting with (e.g., clicking, selecting, tapping, etc.) a particular GUI element. For example, the user can highlight or otherwise annotate content of the first region (e.g., via the platform GUI) and then can interact with one or more GUI elements to embed one or more entries of approval data structure 124 in the content of the document. Approval update component 224 can update the first region to include the one or more entries (e.g., above or below the highlighted content). Approval update component 224 can associate the content of the first region with the entries embedded in the first region in view of the user interaction with the one or more GUI elements. The user can provide an indication that the second region of content corresponds to the one or more second entries, in accordance with embodiments described above. In some embodiments, approval update component 224 can update approval data structure 124 (e.g., at memory 250) to include an indication of the first region and/or the second region of the content that includes the first entries and/or the second entries, respectively. For example, approval data structure 124 can include an additional field that indicates a region of content that corresponds to a respective entry of approval data structure 124. Approval update component 224 can update the additional field of the first entries and/or the second entries to indicate a region of content (e.g., a paragraph number, a range of paragraph numbers, a text string, coordinates of the electronic document, etc.) that correspond to the first entries and/or the second entries. A requestor can provide requests for content included in the first region and/or the second region by updating the first entries and/or the second entries embedded in the first region and/or the second region, in accordance with previously described embodiments. An approver can provide an approval decision in response to such requests, as described above.

Figure 7:
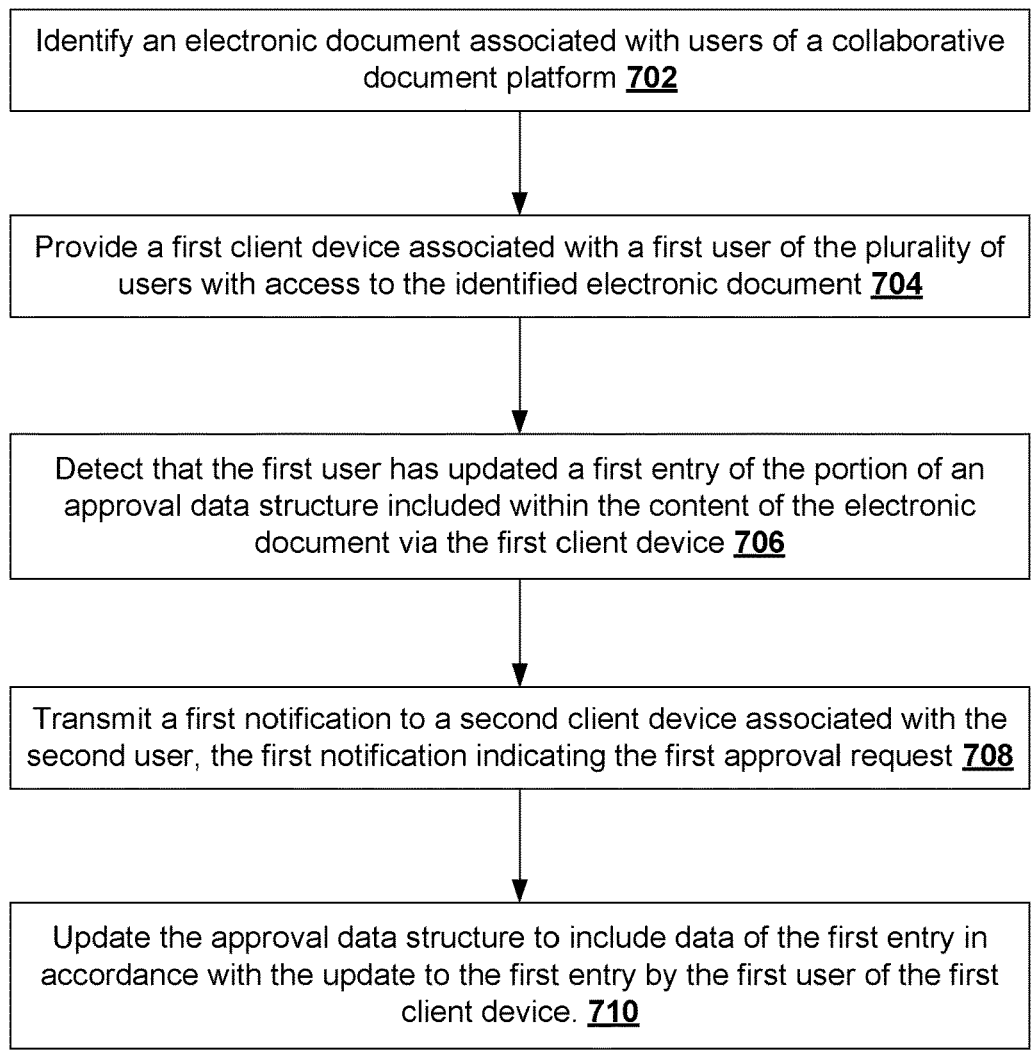
FIG. 7 depicts a flow diagram of an example method for tracking approvals for a collaborative electronic document managed by an electronic document platform, in accordance with implementations of the present disclosure.

FIG. 7 depicts a flow diagram of an example method 700 for providing one or more approval requests of an electronic document based on user interaction with a portion of an approval data structure included within the contents of the electronic document, in accordance with implementations of the present disclosure. Method 700 can be performed by processing logic that can include hardware (circuitry, dedicated logic, etc.), software (e.g., instructions run on a processing device), or a combination thereof. In one implementation, some or all the operations of method 700 can be performed by one or more components of system 100 of FIG. 1. In some embodiments, some or all of the operations of method 700 can be performed by platform 120, approval engine 141, and/or notification engine 151 as described above.

At block 702, processing logic identifies an electronic document associated with users of a collaborative document platform. The electronic document can be associated with an approval data structure including one or more entries that each correspond to an approval request for a respective user of the users to approve at least a portion of content of the electronic document. In some embodiments, the approval data structure can correspond to approval data structure 124, described with respect to FIG. 3 above.

At block 704, processing logic provides a first client device associated with a first user of the users with access to the identified electronic document. A portion of the approval data structure can be included within the content of the electronic document for presentation to the first user. In some embodiments, the portion of the approval data structure included within the content of the electronic document can be included within section 412 of the electronic document that is accessible by the first user via platform GUI 410, as described with respect to FIGS. 4A-4C. In some embodiments, the portion of the approval data structure included within the content of the electronic document can include a first field including an identifier associated with the user (e.g., a reviewer) associated with a corresponding user request and a second field including an indication of a statues of the approval request. In some embodiments, the first field can correspond to reviewer 422 and the second field can correspond to status 424, as described with respect to FIGS. 4A-4C.

At block 706, processing logic detects that the first user has updated a first entry of the portion of the approval data structure included within the content of the electronic document via the first client device. The update to the first entry can correspond to a first approval request for a second user of the plurality of users to approve one or more portions of the content of the electronic document. In some embodiments, processing logic can detect that the first user has updated the first entry of the portion of the approval data structure by receiving an indication of a user interaction with one or more first elements of a GUI (e.g., GUI 410) for a first application associated with a collaborative document platform.

In some embodiments, processing logic can detect that the second user has updated the first entry via the second client device. The second user update can correspond to a response to the first approval request. Processing logic can update (e.g., via approval update component 224) the approval data structure to include data of the update of the first entry by the second user. Processing logic can transmit a second notification (e.g., via notification engine 151) to the first client device associated with the first user indicating the response to the first approval request. In some embodiments, processing logic can receive the request from the second client device in response to a user interaction with one or more second GUI elements of a second application, as described above with respect to FIG. 6. In some embodiments, the second application can be an email application.

In some embodiments, processing logic can, responsive to detecting that the first user has updated the first entry, receive a request from a third client device associated with a third user to modify the one or more portions of the content of the electronic document. Processing logic can transmit a notification to the third client device indicating that the request to modify the one or more portions of the electronic document is denied until a response to the first approval request is received from the second user.

At block 708, processing logic transmits a first notification to a second client device associated with the second user, the first notification indicating the first approval request. In some embodiments, the first notification can be an email notification and/or a push notification. In some embodiments, the first notification can be transmitted via notification engine 151, as described above with respect to FIG. 1.

At block 710, processing logic updates the approval data structure to include data of the first entry in accordance with the update to the first entry by the first user of the first client device.

Figure 8:
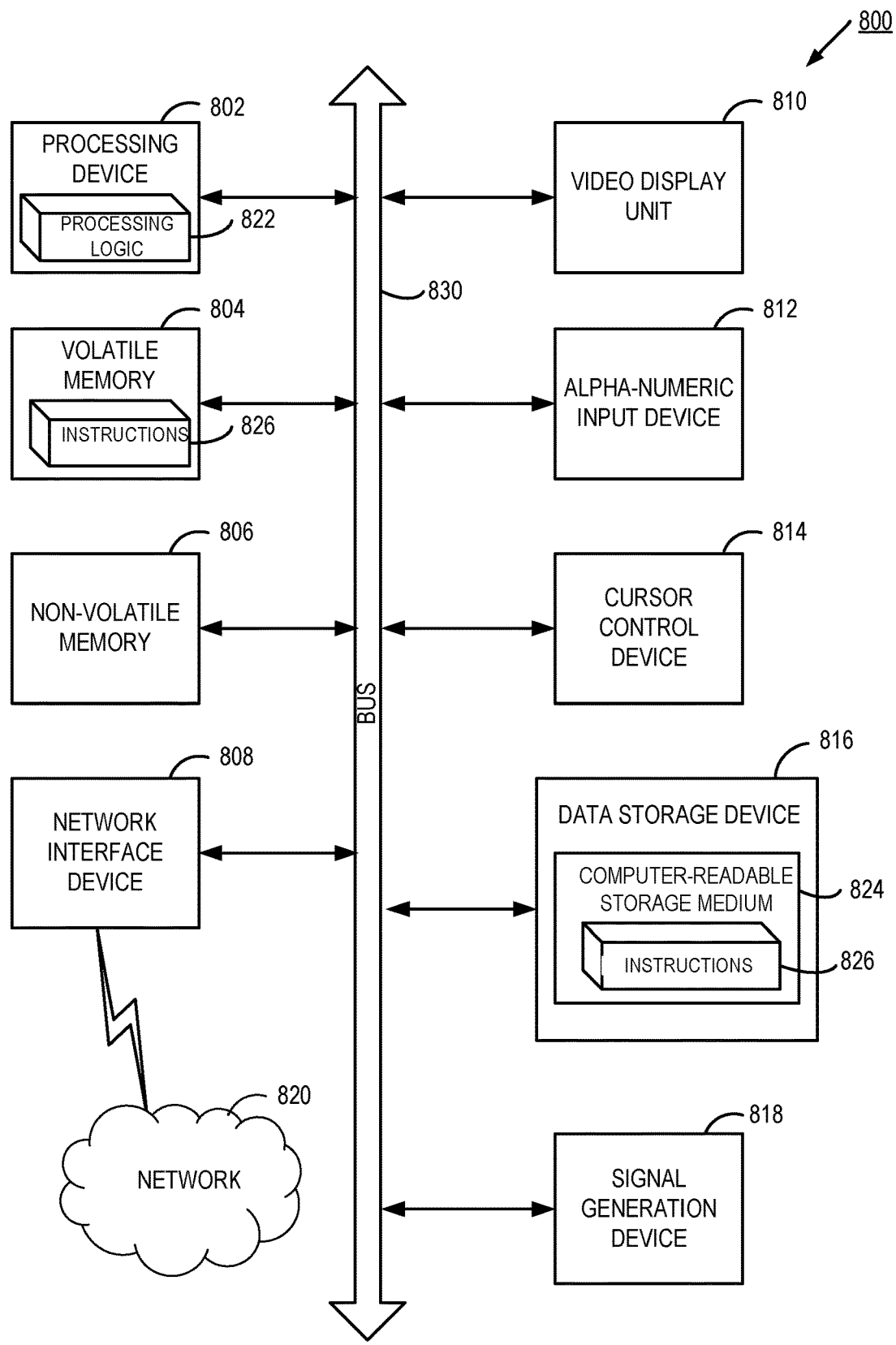
FIG. 8 is a block diagram illustrating an exemplary computer system, in accordance with implementations of the present disclosure.

FIG. 8 is a block diagram illustrating an exemplary computer system 1000, in accordance with implementations of the present disclosure. The computer system 800 can correspond to platform 120 and/or client devices 102A-N, described with respect to FIG. 1. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 840.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 805 for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 820 (e.g., a speaker).

The data storage device 818 can include a non-transitory machine-readable storage medium 824 (also computer-readable storage medium) on which is stored one or more sets of instructions 805 embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 830 via the network interface device 808.

In one implementation, the instructions 805 include instructions for providing fine-grained version histories of electronic documents at a platform. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method for a server computing device, the method comprising:
    providing a first client device associated with a first user of a plurality of users with access to an electronic document comprising content, wherein one or more entries of an approval data structure are embedded within the content of the electronic document for presentation to the first user;
    detecting that the first user has updated a first entry of the one or more entries embedded within the content via the first client device, wherein the update to the first entry corresponds to a first approval request for at least a second user of the plurality of users to approve one or more portions of the content of the electronic document;
    based on the detection, updating the approval data structure to include data of the first entry in accordance with the update to the first entry by the first user of the first client device;
    providing a second client device associated with the second user with access to the electronic document, wherein the data of the updated approval data structure is embedded within the content of the electronic document for presentation to the second user; and
    responsive to detecting that the second user has provided a response to the first approval request by updating the first entry of the updated approval data structure, providing a notification indicating the response to the first client device associated with the first user.

2. The method of claim 1, further comprising:
    transmitting an additional notification to the second client device associated with the second user, wherein the notification indicates the first approval request.

3. The method of claim 2, wherein the additional notification transmitted to the second client device corresponds to at least one of an electronic mail notification or a push notification.

4. The method of claim 1, further comprising:
    detecting that the second user has updated the first entry of at least the portion of the data structure embedded within the content of the electronic document via a second client device, wherein the update to the first entry corresponds to a response to the first approval request from the second user; and
    updating the data structure to include data of the update of the first entry by the second user.

5. The method of claim 1, wherein detecting that the first user has updated the first entry of at least the portion of the data structure comprises receiving an indication of a user interaction with one or more first elements of a graphical user interface (GUI) for a first application associated with a collaborative document platform.

6. The method of claim 5, further comprising:
    receiving a request from the second client device to update the data structure to include additional data corresponding to the first entry, wherein the request is received in response to a user interaction with one or more second GUI elements of a second application associated with the collaborative document platform;
    updating the data structure to include the additional data in response to the request; and
    updating at least the portion of the data structure embedded within the content of the electronic document to include the additional data for presentation to at least the first user via the GUI.

7. The method of claim 6, wherein the second application comprises an email application.

8. The method of claim 1, wherein the first entry of at least the portion of the data structure embedded within the content of the electronic document each comprise a first field including an identifier associated with the respective user of the plurality of users associated with a corresponding approval request and a second field including an indication of a status of the corresponding approval request.

9. The method of claim 1, further comprising:
    responsive to detecting that the first user has updated the first entry of at least the portion of the data structure embedded within the content of the electronic document, receiving a request from a third client device associated with a third user of the plurality of users to modify the one or more portions of the content of the electronic document; and transmitting a notification to the third client device indicating that the request to modify the one or more portions of the content of the electronic document is denied until a response to the first approval request is received from the second user.

10. A system comprising:
a memory device; and
a set of one or more processors coupled to the memory device, the set of one or more processors to perform operations comprising:
providing a first client device associated with a first user of a plurality of users with access to an electronic document comprising content, wherein one or more entries of an approval data structure are embedded within the content of the electronic document for presentation to the first user;
detecting that the first user has updated a first entry of the one or more entries embedded within the content via the first client device, wherein the update to the first entry corresponds to a first approval request for at least a second user of the plurality of users to approve one or more portions of the content of the electronic document;
based on the detection, updating the approval data structure to include data of the first entry in accordance with the update to the first entry by the first user of the first client device;
providing a second client device associated with the second user with access to the electronic document, wherein the data of the updated approval data structure is embedded within the content of the electronic document for presentation to the second user; and
responsive to detecting that the second user has provided a response to the first approval request by updating the first entry of the updated approval data structure, providing a notification indicating the response to the first client device associated with the first user.

11. The system of claim 10, wherein the operations further comprise:
transmitting an additional notification to the second client device associated with the second user, wherein the notification indicates the first approval request.

12. The system of claim 11, wherein the additional notification transmitted to the second client device corresponds to at least one of an electronic mail notification or a push notification.

13. The system of claim 10, wherein the operations further comprise:
detecting that the second user has updated the first entry of at least the portion of the data structure embedded within the content of the electronic document via a second client device, wherein the update to the first entry corresponds to a response to the first approval request from the second user; and
updating the data structure to include data of the update of the first entry by the second user.

14. The system of claim 13, wherein detecting that the first user has updated the first entry of at least the portion of the data structure comprises receiving an indication of a user interaction with one or more first elements of a graphical user interface (GUI) for a first application associated with a collaborative document platform.

15. The system of claim 14, wherein the operations further comprise:
receiving a request from the second client device to update the data structure to include additional data corresponding to the first entry, wherein the request is received in response to a user interaction with one or more second GUI elements of a second application associated with the collaborative document platform;
updating the data structure to include the additional data in response to the request; and
updating at least the portion of the data structure embedded within the content of the electronic document to include the additional data for presentation to at least the first user via the GUI.

16. The system of claim 15, wherein the second application comprises an email application.

17. The system of claim 10, wherein the first entry of at least the portion of the data structure embedded within the content of the electronic document each comprise a first field including an identifier associated with the respective user of the plurality of users associated with a corresponding approval request and a second field including an indication of a status of the corresponding approval request.

18. The system of claim 10, wherein the operations further comprise:
responsive to detecting that the first user has updated the first entry of at least the portion of the data structure embedded within the content of the electronic document, receiving a request from a third client device associated with a third user of the plurality of users to modify the one or more portions of the content of the electronic document; and
transmitting a notification to the third client device indicating that the request to modify the one or more portions of the content of the electronic document is denied until a response to the first approval request is received from the second user.

19. A non-transitory computer readable storage medium comprising instructions that, when executed by a processing device, cause the processing device to perform operations comprising:
providing a first client device associated with a first user of a plurality of users with access to an electronic document comprising content, wherein one or more entries of an approval data structure are embedded within the content of the electronic document for presentation to the first user;
detecting that the first user has updated a first entry of the one or more entries embedded within the content via the first client device, wherein the update to the first entry corresponds to a first approval request for at least a second user of the plurality of users to approve one or more portions of the content of the electronic document;
based on the detection, updating the approval data structure to include data of the first entry in accordance with the update to the first entry by the first user of the first client device;
providing a second client device associated with the second user with access to the electronic document, wherein the data of the updated approval data structure is embedded within the content of the electronic document for presentation to the second user; and
responsive to detecting that the second user has provided a response to the first approval request by updating the first entry of the updated approval data structure, providing a notification indicating the response to the first client device associated with the first user.

20. The non-transitory computer readable storage medium of claim 19, further comprising:

transmitting an additional notification to the second client device associated with the second user, wherein the notification indicates the first approval request.

* * * * *